(12) United States Patent
Tamura et al.

(10) Patent No.: US 8,419,115 B2
(45) Date of Patent: Apr. 16, 2013

(54) STRUCTURE FOR SIDE SECTION OF VEHICLE BODY

(75) Inventors: Naoyuki Tamura, Wako (JP); Koichi Takahashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/577,481

(22) PCT Filed: Mar. 23, 2011

(86) PCT No.: PCT/JP2011/056949
§ 371 (c)(1),
(2), (4) Date: Aug. 7, 2012

(87) PCT Pub. No.: WO2011/118618
PCT Pub. Date: Sep. 29, 2011

(65) Prior Publication Data
US 2012/0306239 A1 Dec. 6, 2012

(30) Foreign Application Priority Data

Mar. 26, 2010 (JP) .................. 2010-072858
Mar. 26, 2010 (JP) .................. 2010-072935

(51) Int. Cl.
*B60J 7/00* (2006.01)
(52) U.S. Cl.
USPC ....................... 296/198; 296/209

(58) Field of Classification Search .......... 296/209, 296/198
See application file for complete search history.

(56) References Cited

U.S. PATENT DOCUMENTS 4,471,992 A * 9/1984 Matsuura et al. ............. 296/209
6,325,451 B1 * 12/2001 Sikorski ....................... 296/204

FOREIGN PATENT DOCUMENTS

| JP | S47-49090 | 12/1972 |
|----|-----------|---------|
| JP | S59-13370 | 1/1984 |
| JP | S63-123374 | 8/1988 |
| JP | 04-092783 | 3/1992 |
| JP | 2002-274425 | 9/2002 |
| JP | 3528624 | 3/2004 |
| JP | 2007-131264 | 5/2007 |

* cited by examiner

*Primary Examiner* — Joseph Pape
(74) *Attorney, Agent, or Firm* — Rankin, Hill & Clark LLP

(57) ABSTRACT

A vehicle body (12; 12A; 12B) including: left and right side sills (15, 15) extending in the front-rear direction of the vehicle (11); and rear wheel wells (17, 17) located behind the left and right side sills and covering the left and right rear wheels (16, 16). The left and right side sills are formed in a closed cross-sectional shape continuous from the front ends to the rear ends thereof. The rear end sections (35, 35) of the left and right side sills are joined, with the closed cross-sectional shape maintained, to the left and right rear wheel wells by joining members (18, 18; 18A, 18A; 18B, 18B).

16 Claims, 13 Drawing Sheets

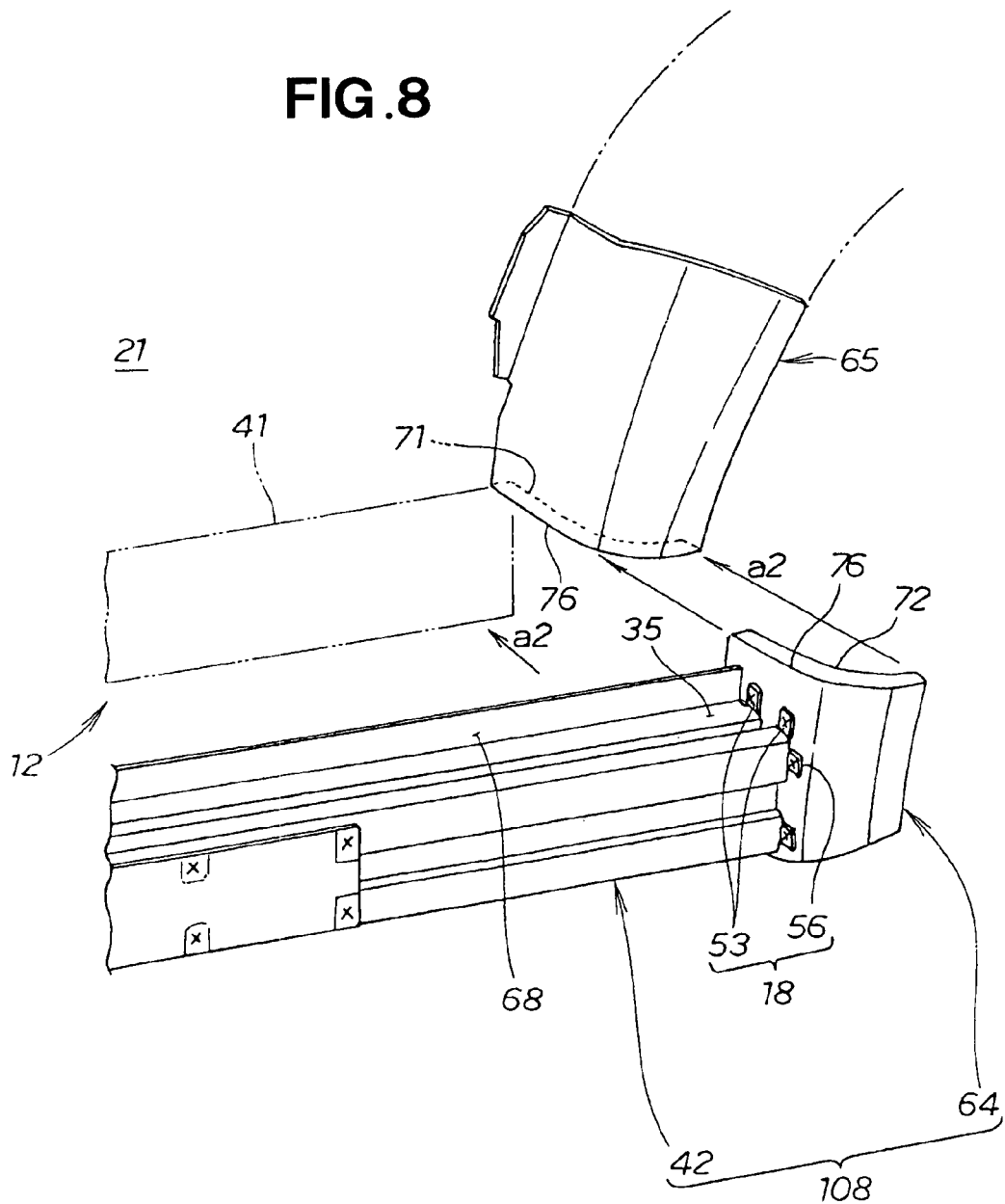

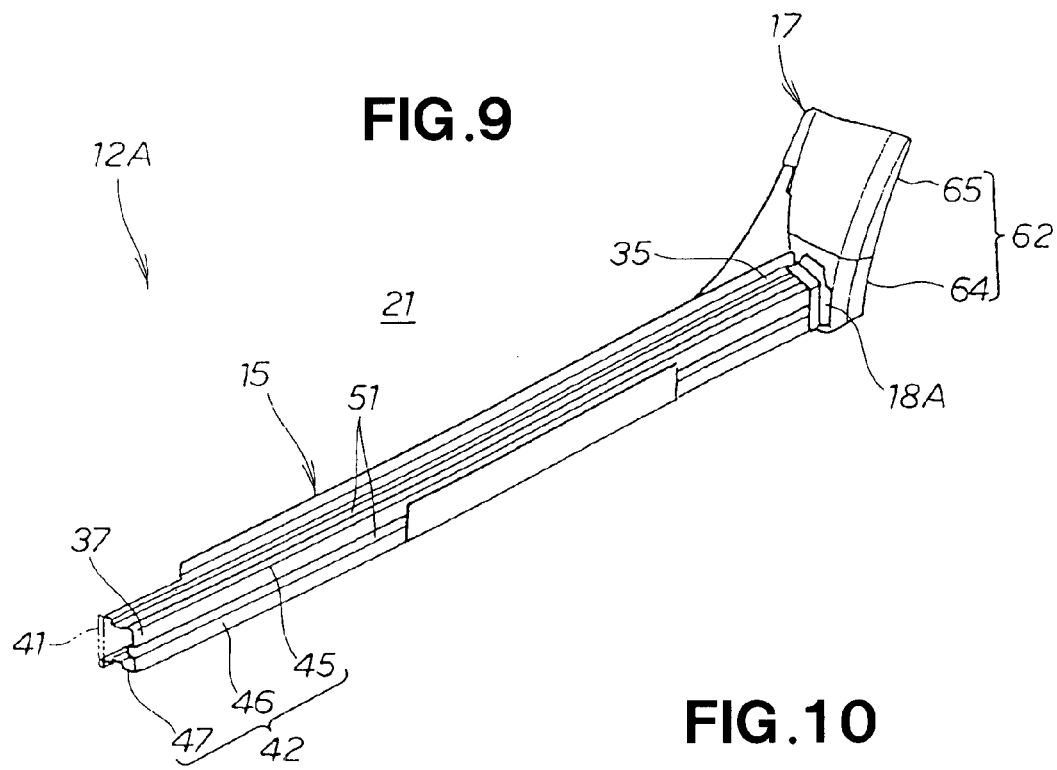

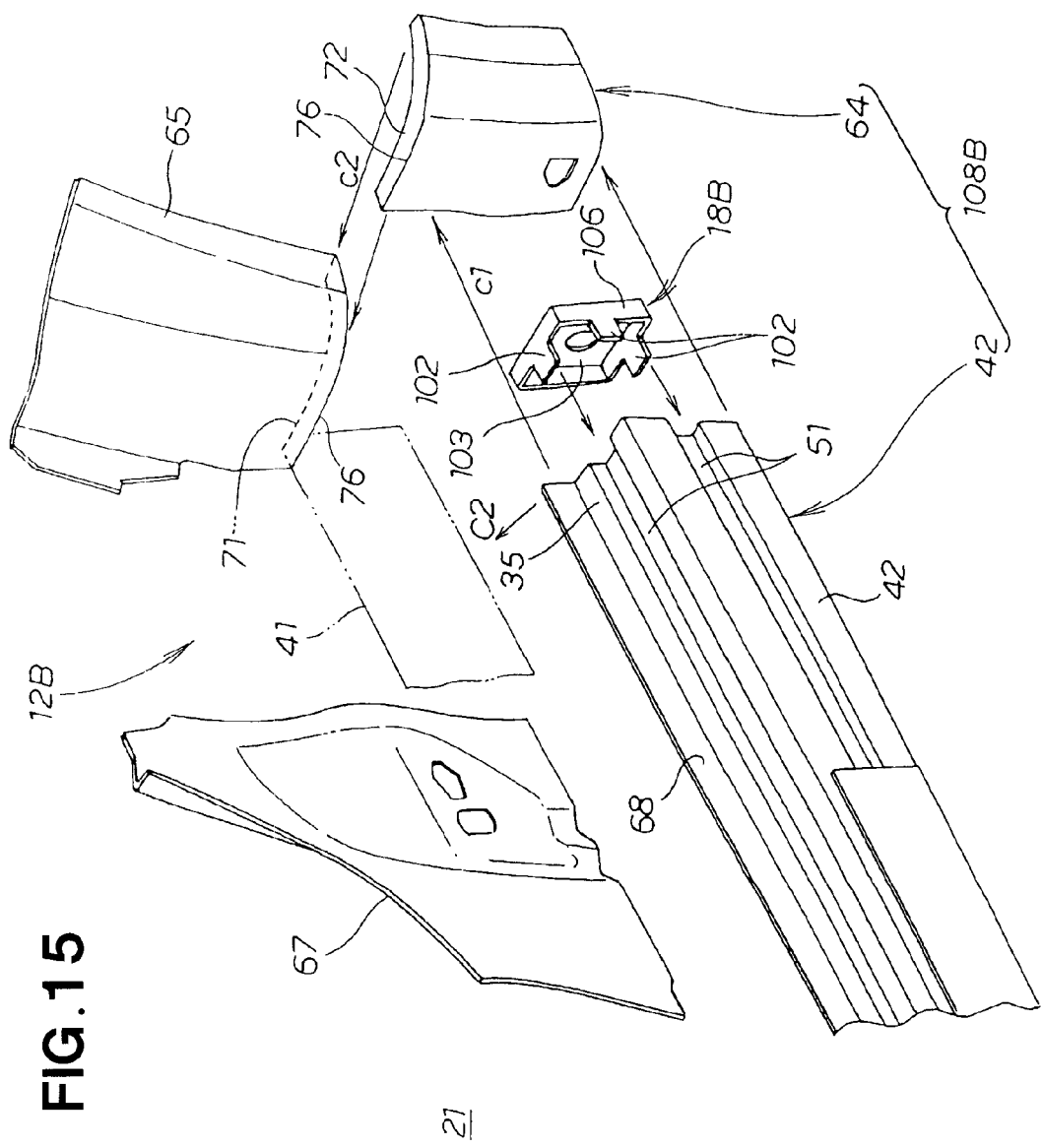

STRUCTURE FOR SIDE SECTION OF VEHICLE BODY

TECHNICAL FIELD

The present invention relates to a vehicle body side structure including right and left side sills disposed on right and left sides of a vehicle body and extending longitudinally of the vehicle body, and right and left rear wheelhouses having lower end portions joined to rear end portions of the side sills.

BACKGROUND ART

Right and left side sills of a vehicle are essential elements of a vehicle body frame, as disclosed in Patent Literature 1 below. A side sill disclosed in Patent Literature 1 is reinforced by a reinforcement member extending along an inside of the side sill. The reinforcement member can prevent the side sill from being bent by an impact force applied to a side portion of a vehicle upon impact on the side portion of the vehicle.

Recently, a technique for increasing a rigidity of a vehicle body has been needed. To increase the rigidity of the vehicle body, it may be suggested that rigidities of right and left side sills be increased and rigidities of junctions where rear end portions of the side sills are joined to right and left rear wheelhouses be increased. However, this suggestion is not preferable. This is because the vehicle body may have a complex structure and a heavy weight if the rigidities of the side sills and the rigidities of the junctions are merely increased.

It may also be suggested that the right and left side sills be connected to the right and left rear wheelhouses through right and left connection members. These connection members need to conform to a vehicular body shape. The side sills differ in cross-sectional shape from the rear wheelhouses, therefore, rigidities of the connection members need to be sufficiently increased taking into consideration a structural continuity between the side sills and the rear wheelhouses. It is thus necessary to improve the technique for increasing the rigidity of the vehicle body.

PRIOR ART LITERATURE

Patent Literature
Patent Literature 1: Japanese Patent No. 3528624

SUMMARY OF INVENTION

Technical Problem

It is an object of the present invention to provide a vehicle body side structure which is simple and has a high rigidity.

Solution to Problem

According to one aspect of the present invention, there is provided a vehicle body side structure comprising: right and left side sills disposed on left and right sides of a vehicle body and extending longitudinally of the vehicle body; right and left rear wheelhouses disposed rearward of the right and left side sills and covering upper halves of right and left rear wheels. The right and left side sills have closed-cross-sectional shapes continuously extending from front ends of the right and left side sills to rear ends of the right and left side sills, and the right and left side sills have right and left joining members joining rear end portions of the right and left side sills to the right and left rear wheelhouses with the closed-cross-sectional shapes maintained.

Preferably, the right and left side sills comprise right and left inner sections disposed laterally inward of the vehicle body and right and left outer sections disposed laterally outward of the vehicle body, and the right and left outer sections are provided with the right and left joining members.

Preferably, the right and left outer sections are generally U-shaped cross-sectional members opened in a laterally inward direction of the vehicle body, the generally U-shaped cross-sectional members each include a vertical plate portion disposed laterally outward of the vehicle body in generally perpendicular orientation, a top plate portion extending from a top end of the vertical plate portion in the laterally inward direction of the vehicle body, and a bottom plate portion extending from a bottom end of the vertical plate portion in the laterally inward direction of the vehicle body, and each of the right and left joining members is provided to at least one of the vertical plate portion and the top plate portion.

Preferably, at least one of the vertical plate portion, the top plate portion and the bottom plate portion has a bead extending longitudinally of the right and left outer sections.

Preferably, the right and left joining members are formed integrally with the rear end portions of the right and left side sills, and lie on and are joined to the right and left rear wheelhouses.

Preferably, the right and left joining members are separate members from the right and left side sills, the separate members comprise right and left joined portions joined to the rear end portions of the right and left side sills, and right and left flange portions lying on and joined to the right and left rear wheelhouses, and the right and left flange portions are formed integrally with the right and left joined portions.

Preferably, the right and left joining members are separate members from the right and left side sills, the separate members comprise right and left joined portions joined to inner surfaces of the rear end portions of the right and left side sills, and right and left plate portions lying on and joined to the right and left rear wheelhouses, and the right and left plate portions are formed integrally with the right and left joined portions.

Preferably, the right and left rear wheelhouses comprise right and left wheelhouse bodies assembled onto the vehicle body, and right and left wheelhouse extensions extending downward from and joined to front lower ends of the right and left wheelhouse bodies, the right and left wheelhouse bodies have right and left flanges at the front lower ends, the right and left wheelhouse extensions have right and left flanges joined to the right and left flanges of the right and left wheelhouse bodies assembled onto the vehicle body, and the right and left joining members are joined to the right and left wheelhouse extensions joined to the right and left wheelhouse bodies.

Preferably, the right and left flanges of the right and left wheelhouse bodies have mating surfaces and the right and left flanges of the right and left wheelhouse extensions have mating surfaces underlying and joined to the mating surfaces of the right and left flanges of the right and left wheelhouse bodies, the mating surfaces of the right and left flanges of the right and left wheelhouse bodies have laterally inner ends and laterally outer ends, and are slanted with the laterally outer ends located higher than the laterally inner ends, and the mating surfaces of the right and left flanges of the right and left wheelhouse extensions have laterally inner ends and laterally outer ends, and are slanted with the laterally outer ends located higher than the laterally inner ends.

ADVANTAGEOUS EFFECTS OF THE INVENTION

Since the right and left side sills have the closed-cross-sectional shapes continuously extending from front ends of the side sills to rear ends of the side sills, the side sills have high rigidities. Since the rear end portions of the right and left side sills are joined through the right and left joining members to the right and left wheelhouses with the closed-cross-sectional shapes of the side sills continuously extending longitudinally of the vehicle body, joints between the right and left side sills are joined to the right and left rear wheelhouses have high rigidities. Since the right and left side sills themselves have the high rigidities and the joints have the high rigidities, therefore, the vehicle body entirely has a high rigidity. An external force applied to the right and left side sills can be substantially evenly dispersed into a rear part of the vehicle body because the external force can be more efficiently transmitted through the rear end portions of a closed-cross-section and the right and left joining members to the right and left rear wheelhouses. The closed-cross-sectional shapes of the right and left side sills extend continuously from the front ends to the rear ends and the rear end portions of the right and left side sills are joined by the right and left joining members to the right and left rear wheelhouses. Such a simple structure increases rigidities of lateral sides of the vehicle body.

The right and left joining members are provided only to the right and left outer sections. This arrangement has the advantage that the rear end portions of the right and left side sills can be easily joined to the right and left rear wheelhouses by the right and left joining members with the closed-cross-sectional shapes continuously extending longitudinally of the vehicle body. Such a simple arrangement can increase a rigidity of a side structure of the vehicle body.

Each of the right and left joining members is provided to at least one of the top plate portion and the vertical plate portion of each of the outer sections having the laterally inward opened U-shaped-cross-section. This arrangement has the advantage that the rear end portions of the right and left side sills can be easily joined to the right and left rear wheelhouses by the right and left joining members with the closed-cross-sectional shapes continuously extending longitudinally of the vehicle body. Such a simple arrangement can increase a rigidity of a side structure of the vehicle body.

At least one of the vertical plate portion, the top plate portion and the bottom plate portion has a bead extending longitudinally of the right and left outer sections. This arrangement can increase rigidities of the right and left outer sections.

A process of joining the right and left side sills to the right and left rear wheelhouses require the small number of components and the small number of steps because this process requires merely bringing the joining members integral with the side sills onto the rear wheelhouses and joining the joining members to the rear wheelhouses. Since the process eliminates a step of joining the joining members to the side sills, there is no likelihood of rigidity reduction caused by such a step. Thus, a rigidity of the vehicle body can be increased.

Since the right and left joining members are separate from the right and left side sills, the rear end portions of the side sills have simple configurations free from the joining members. In addition, each of the right and left joining members can be formed by the small number of elements because the joining members include the joined portions and the flange portions formed integrally with the sill joined portions.

Since the right and left joining members are separate from the right and left side sills, the rear end portions of the side sills have simple configurations free from the joining members. In addition, each of the right and left joining members can be formed by the small number of elements because the joining members include the joined portions and the plate portions formed integrally with the joined portions.

The right and left rear wheelhouses are separated into upper sides defining the right and left wheelhouse bodies and lower sides defining the right and left wheelhouse extensions. When the right and left side sills are to be assembled onto the vehicle body, the wheelhouse extensions to which are joined the side sills are joined to the wheelhouse extensions. That is to say, the wheelhouse extensions are joined to the rear end portions of the side sills having the closed-cross-sectional shapes continuously extending from the front ends to the rear ends, after which the wheelhouse extensions are joined to the wheelhouse bodies, such that the rear wheelhouses can be completed without being subjected to direct influence of the side sills. Since the side sills do not directly affect completion of the rear wheelhouse, a degree of freedom to join the wheelhouse bodies to the wheelhouse extensions is enhanced. In other words, the side sills can be easily reliably joined to the rear wheelhouses even with the closed-cross-sectional shapes of the side sills continuously extending from the front ends to the rear ends. Since the side sills have the uniform closed-cross-sectional shapes continuously longitudinally extending to the rear wheelhouses, the rigidity of the vehicle body is increased.

The mating surfaces of the right and left flanges of the wheelhouse bodies and the wheelhouse extensions are slanted with the laterally outer ends located higher than the laterally inner ends. The mating surfaces of the flanges of the wheelhouse bodies acts as guide surfaces assisting in: positioning the respective flanges of the wheelhouse extensions relative to the respective flanges of the wheelhouse bodies at locations offset laterally outward from the flanges of the wheelhouse bodies; and then joining the respective flanges of the wheelhouse extensions to the respective flanges of the wheelhouse bodies. Since the mating surfaces of the flanges of the wheelhouse bodies and the wheelhouse extensions are slanted, the wheelhouse extensions can be easily positioned relative to the wheelhouse bodies at locations offset laterally outward from the wheelhouse bodies, and then joined to the wheelhouse bodies.

BRIEF DESCRIPTION OF DRAWINGS

FIG. 8 is a view showing a method for assembling the left side sill and the left rear wheelhouse shown in FIG. 5 onto the vehicle body;

FIG. 9 is a perspective view of a vehicle body side structure in a second embodiment of the present invention with a left side sill joined to a left rear wheelhouse;

FIG. 10 is an enlarged view of a junction where a rear end portion of the left side sill and the left rear wheelhouse shown in FIG. 9 are joined together;

FIG. 15 is an exploded view of a junction where a rear end portion of the left side sill and the left rear wheelhouse shown in FIG. 14 are joined together when the junction is viewed from a lateral outside of a vehicle body.

MODE FOR CARRYING OUT THE INVENTION

Certain preferred embodiments of the present invention are described below with reference to the accompanying drawings.

Embodiment 1

A first embodiment of the present invention is described below with reference to FIG. 1 to FIG. 8.

Figure 1:
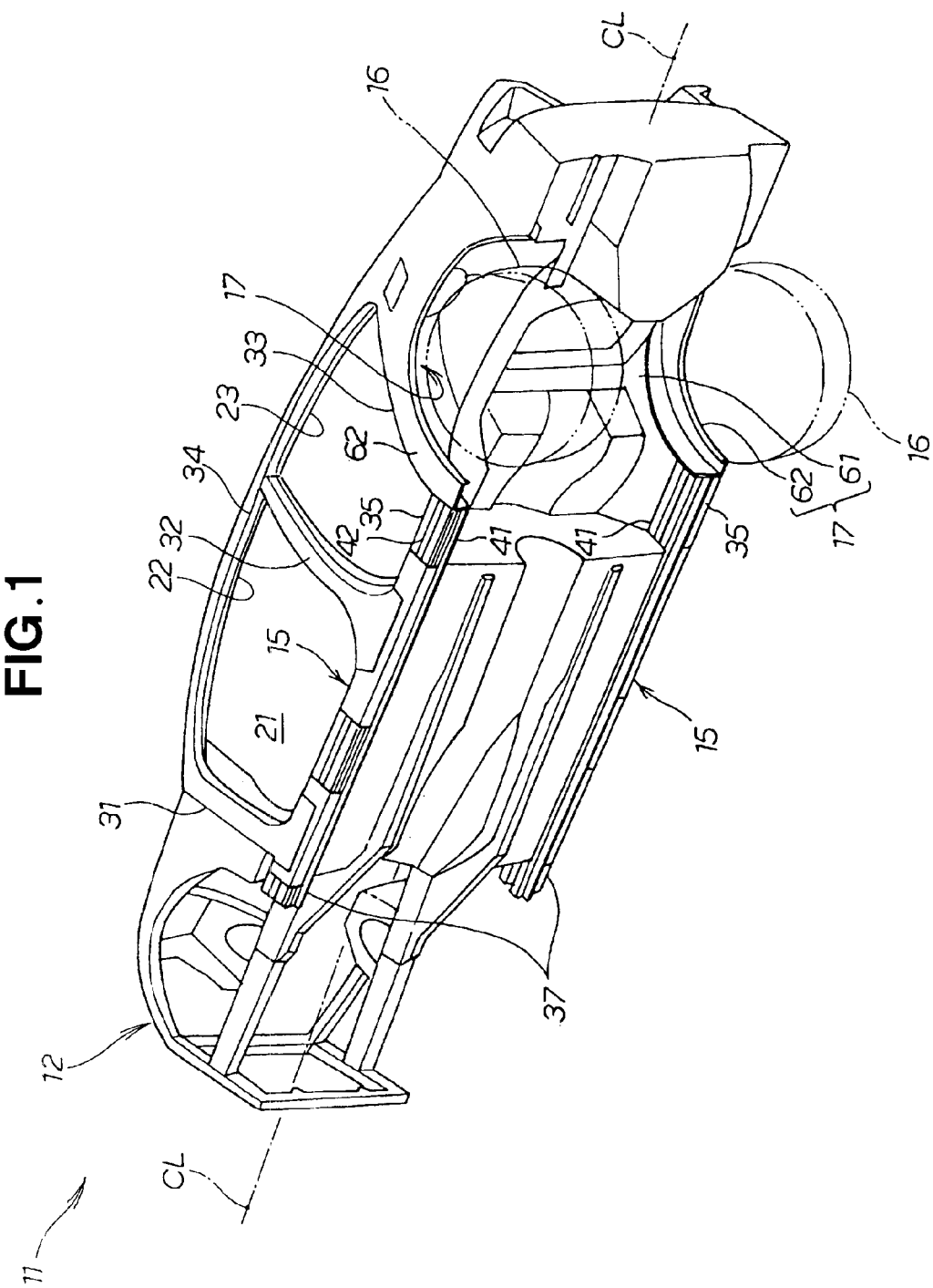
FIG. 1 is a perspective view of a vehicle body having a side structure in a first embodiment of the present invention.

As shown in FIG. 1, a vehicle 11 is a car with four doors. The vehicle 11 includes a vehicle body 12 having a middle portion defining a passenger compartment 21. The vehicle body 12 is a monocoque body having right and left halves disposed symmetrically about a longitudinal centerline CL extending in a front-and-rear direction of the vehicle 11. The vehicle body 12 has right and left sides each defining a front door opening 22 and a rear door opening 23. The door openings 22, 23 are opened or closed by doors (not shown). The vehicle body 12 includes right and left side sills 15, right and left front pillars 31, right and left center pillars 32, right and left rear pillars 33, right and left roof side rails 34, and right and left rear wheelhouses 17.

The right and left side sills 15 are disposed on the right and left sides of the vehicle body 12 and extend in a front-and-rear direction of the vehicle body 12. The right and left front pillars 31 extend upward from front end portions 37 of the right and left side sills 15. The right and left center pillars 32 extend upward from portions of the right and left side sills 15. The right and left rear pillars 33 extend upward from rear end portions 35 of the right and left side sills 15. The right and left rear pillars 33 extend upward from rear end portions 35 of the right and left side sills 15. The right and left roof side rails 34 extend from top ends of the right and left front pillars 31 over top ends of the right and left center pillars 32 to top ends of the right and left rear pillars 33.

The right and left side sills 15 are disposed symmetrically about the longitudinal center line CL. Likewise, the right and left rear wheelhouses 17 are disposed symmetrically about the longitudinal center line CL. The left side sill 17 and the left rear wheelhouse 17 are described in detail below. Descriptions of the right side sill 15 and the right rear wheelhouse 17, which are the same in structure as the left side sill 15 and the left rear wheelhouse 17, respectively, are omitted.

Figure 2:
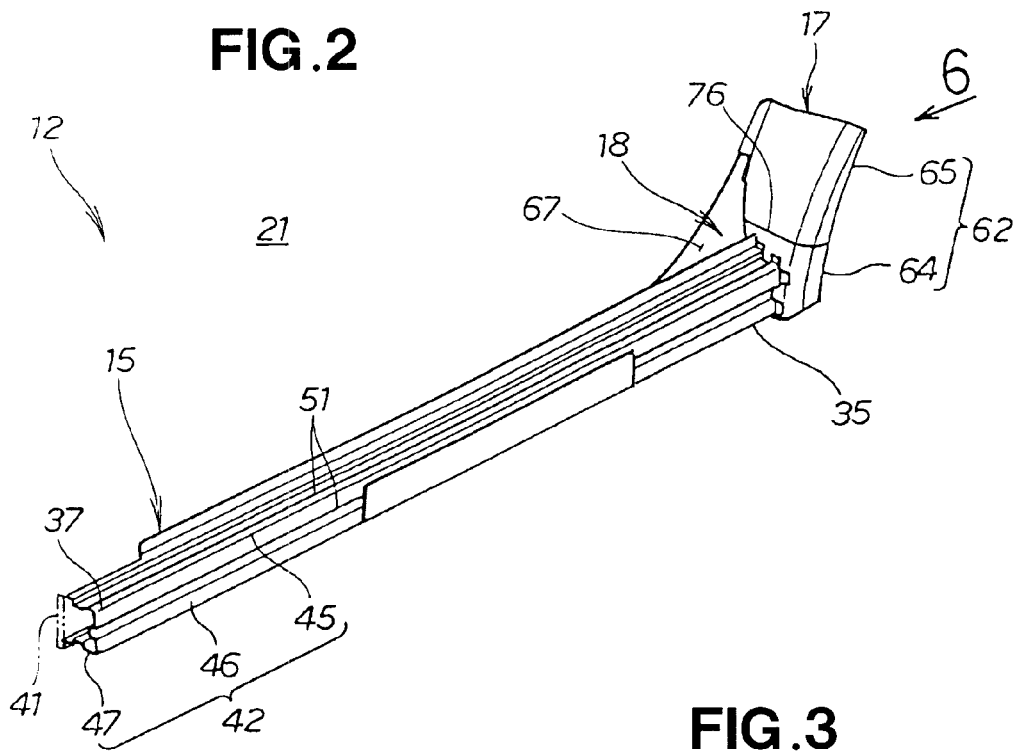
FIG. 2 is a perspective view of a left side sill shown in FIG. 1 and joined to a left rear wheelhouse.
Figure 3:
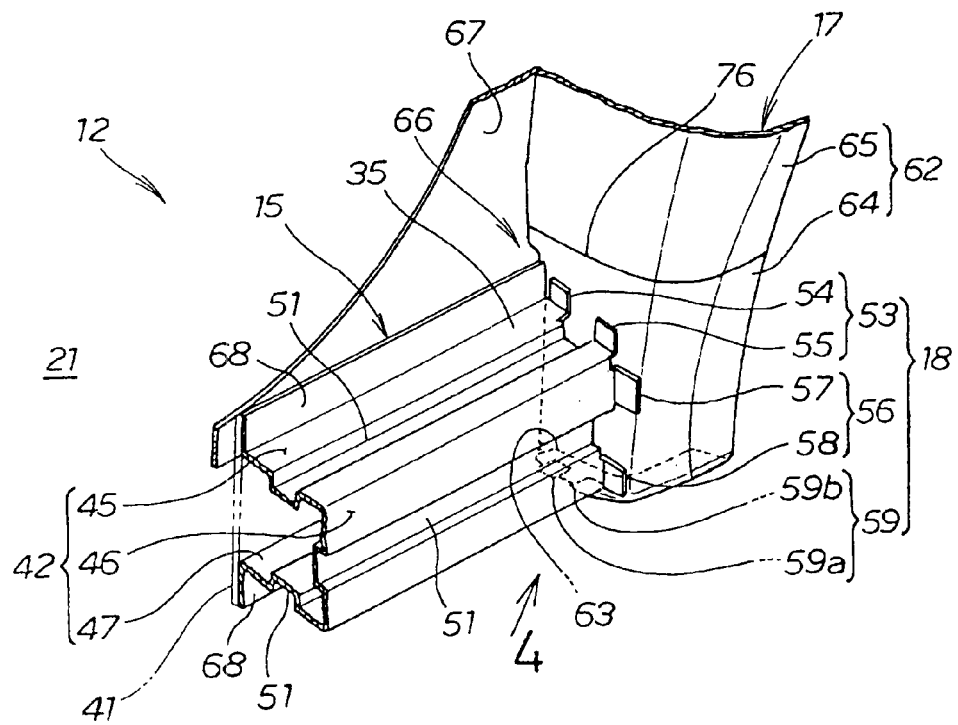
FIG. 3 is an enlarged view of a junction where a rear end portion of the left side sill and the rear wheelhouse shown in FIG. 2 are joined together.
Figure 4:
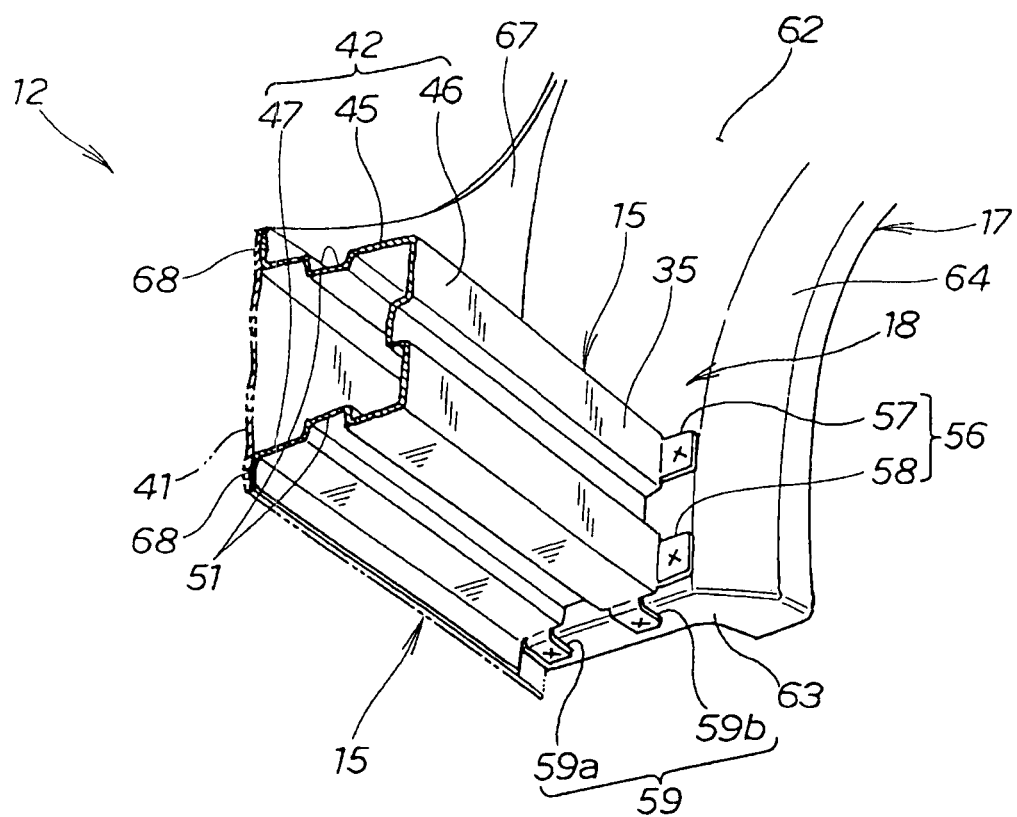
FIG. 4 is a view of the junction as viewed in a direction of an arrow 4 of FIG. 3.

As shown in FIG. 2 to FIG. 4, the left side sill 15 has a uniform closed cross-sectional shape extending in the front-and-rear direction of the vehicle body 12. That is to say, the side sill 15 includes a laterally inner section 41 and a laterally outer section 42. The laterally inner section 41 and the laterally outer section 42 define the closed cross-sectional shape.

The outer section 42 of the side sill 15 is a generally U-shaped cross-sectional member which is opened in a laterally inward direction of the vehicle body 12. More specifically, the outer section 42 includes a vertical plate portion 46 disposed in generally perpendicular orientation, a top plate portion 45 extending from a top end of the vertical plate portion 46 in the laterally inward direction of the vehicle body 12 (in a direction toward the passenger compartment 21), and a bottom plate portion 47 extending from a bottom end of the vertical plate portion 46 in the laterally inward direction of the vehicle body 12.

The top plate portion 45 has inner and outer ends and is slanted with the inner end located higher than the outer end. The top plate portion 45 includes a flange 68 extending upward from the inner end. The bottom plate portion 47 has inner and outer ends and is slanted with the inner end located lower than the outer end. The bottom plate portion 47 has a flange 68 extending downward from the inner end. The outer section 42 of the side sill 15 is of a hat-shaped cross-section. The flanges 68, 68 of the top and bottom plate portions 45, 47 of the outer section 42 are joined to the inner section 41.

At least one of the vertical plate portion 46, the top plate portion 45 and the bottom plate portion 47 has a bead 51 extending a front-and-rear direction of the outer section 42 for the purpose of reinforcement. The bead 51 is outward recessed or projects.

As shown in FIG. 1, the rear wheelhouse 17 is disposed rearward of the side sill 15 and covers at least an upper half of the rear wheel 16. The rear wheelhouse 17 is formed along the rear wheel 16 and includes a laterally inner panel 61 and a laterally outer panel 62. The laterally outer panel 62 includes a wheelhouse body 65 covering at least an upper half of the rear wheel 16 and a wheelhouse extension 64 extending downward from and joined to a front lower end of the wheelhouse body 65.

Figure 5:
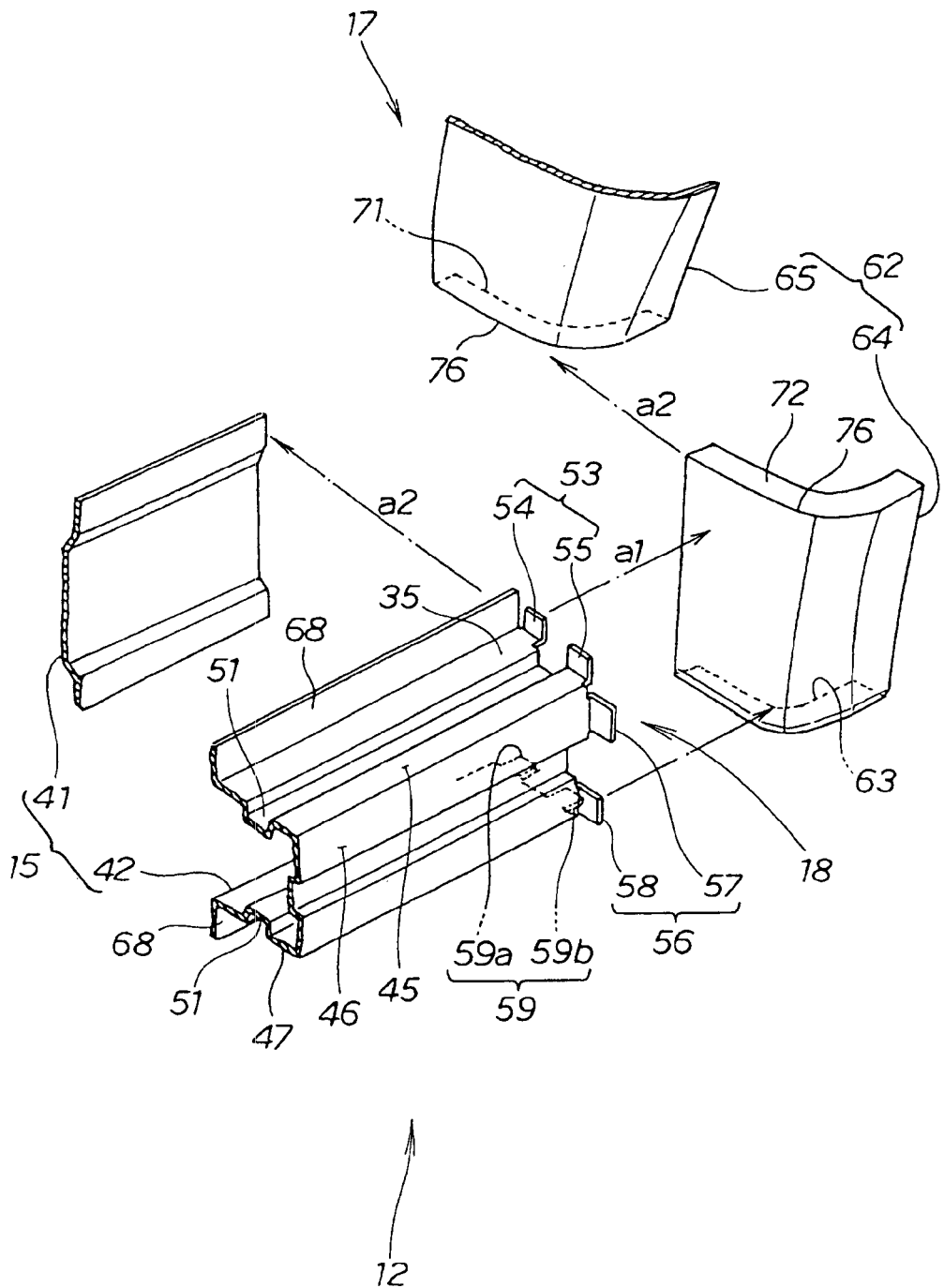
FIG. 5 is an exploded view of the junction where the rear end portion of the left side sill and the left rear wheelhouse are joined together.
Figure 6:
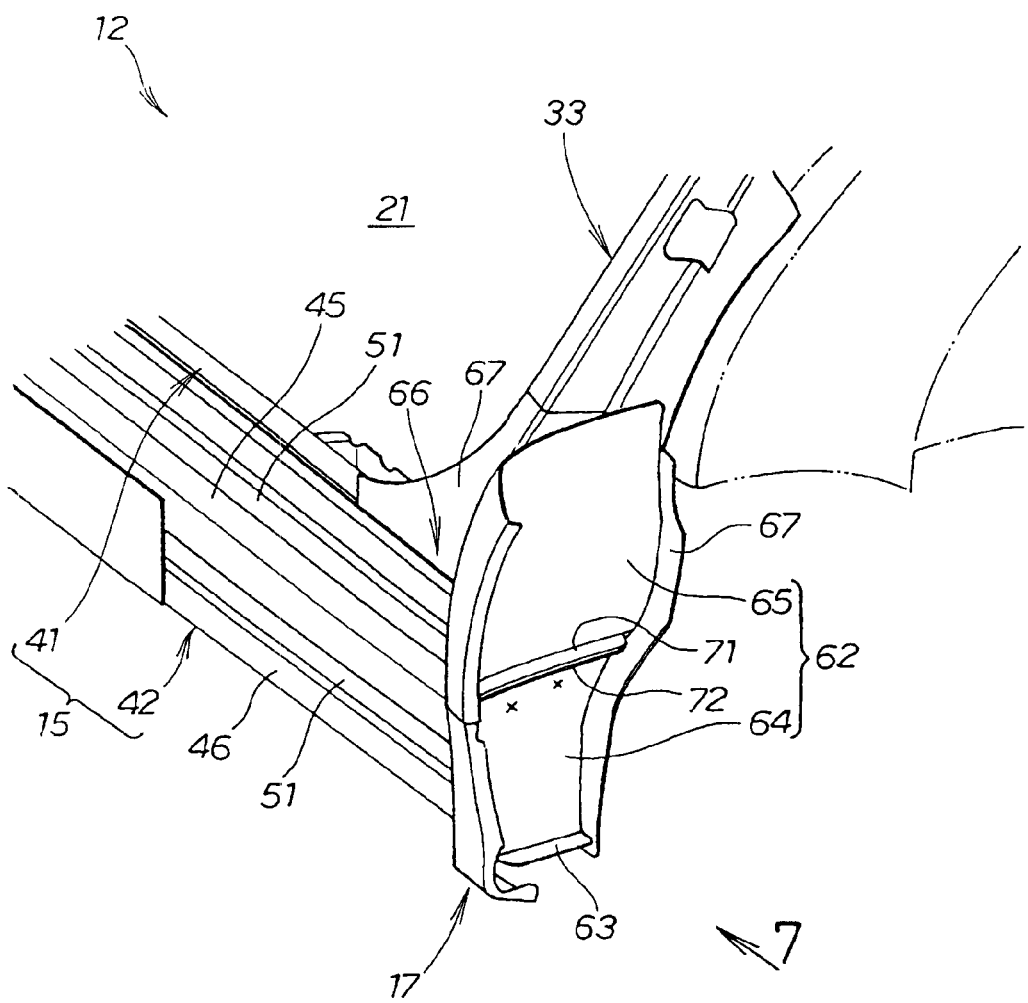
FIG. 6 is a view of the left side sill of FIG. 2 as viewed in a direction of an arrow 6 of FIG. 2.
Figure 7:
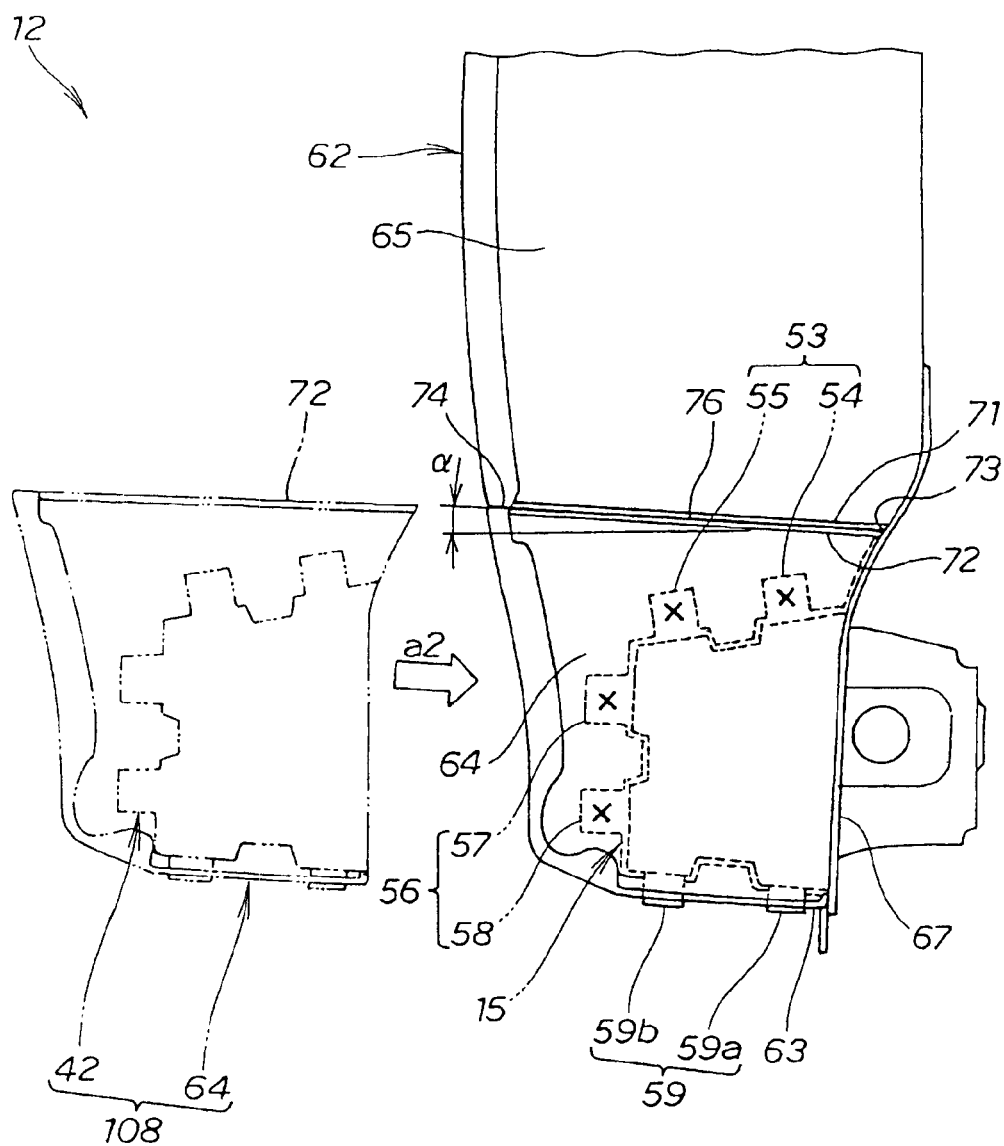
FIG. 7 is a view of the left rear wheelhouse as viewed in a direction of arrow 7 of FIG. 6.

As shown in FIG. 5 to FIG. 7, the wheelhouse body 65 has a flange 71 at the front lower end thereof. The wheelhouse extension 64 has a top flange 72 at a top end thereof and a bottom flange 63 at a bottom end thereof. The flange 71 of the wheelhouse body 65 and the top flange 72 have respective mating surfaces 76, 76 lying on and joined to each other. The mating surfaces 76, 76 each have a laterally inner end 73 and a laterally outer end 74 and are slanted at an angle a with the laterally outer end 74 located higher than the laterally inner end 73. The bottom flange 63 is parallel to the bottom plate portion 47 of the outer section 42. The top flange 72 is joined to the flange 71 of the wheelhouse body 65 assembled onto the vehicle body 12. The wheelhouse extension 64 combines with the wheelhouse body 65 with the flanges 71, 72 joined together by welding such as spot-welding.

As shown in FIG. 3 to FIG. 6, the rear end portion 35 of the side sill 15 has joining members 18 joined to the rear wheelhouse 17. More specifically, the joining members 18 are provided to the outer section 42 of the side sill 15. The joining members 18 are integral with the rear end portion 35 of the side sill 15. The joining members 18 lie on and are joined to the laterally outer panel 62 of the rear wheelhouse 17. More specifically, the joining members 18 are provided to the top plate portion 45, the bottom plate portion 47 and the vertical plate portion 46. The joining members 18 are joined to the wheelhouse extension 64. That is to say, the joining members 18 are joined through the wheelhouse extension 64 to the wheelhouse body 65.

The joining members 18 include top flanges 53, vertical flanges 56 and bottom flanges 59. The top flanges 53 include first and second flanges 54, 55 extending upward from the top plate portion 45 of the outer section 42. The vertical flanges 56 include first and second flanges 57, 58 extending laterally outward from the vertical plate portion 46. The bottom flanges 59 include first and second flanges 59a, 59b extending downward from the bottom plate portion 47. The first and second flanges 59a, 59b are joined to the bottom flange 63 of the rear wheelhouse 17.

As shown in FIG. 2 to FIG. 4, a corner 66 between the rear end portion 35 of the side sill 15 and the rear wheelhouse 17 is reinforced by a lower end portion 67 of the rear pillar 33. That is to say, the rear end portion 67 serves as a gusset (a reinforcing plate). As shown in FIG. 6 and FIG. 7, the rear pillar 33 has its bottom end located at the same level as bottom ends of the side sill 15 and the rear wheelhouse 17.

A method for assembling the side sill 15 and the rear wheelhouse 17 onto the vehicle body 17 is described below.

First, the vehicle body 12 with the inner section 41 and the wheelhouse body 65 assembled thereonto is provided as shown in FIG. 8. It is noted that the outer section 42 and the wheelhouse extension 64 are not yet assembled onto the vehicle body 12.

Second, the flanges 53, 56, 59 provided to a rear end of the outer section 42 are brought onto a front surface and the bottom flange 63 of the wheelhouse extension 64, as indicated by an arrow a1 of FIG. 5. Then, the flanges 53, 56, 59 are joined to the front surface and the bottom flange 63 by welding such as spot-welding. As a result, the outer section 42 is joined to the wheelhouse extension 64, as shown in FIG. 8. An assembly 108 defined by the outer section 42 and the wheelhouse extension 64 which are joined together is hereinafter referred to as "side sill outer assembly 108".

Next, the side sill outer assembly 108 is positioned relative to the vehicle body 12 at a location offset laterally outward from the vehicle body 12 and then assembled onto the vehicle body 12, as indicated by an arrow a2 of FIG. 8. More specifically, the outer section 42 is positioned relative to the inner section 41 at the location offset laterally outward from the inner section 41, and then brought onto the inner section 41. At the same time, the top flange 72 of the wheelhouse extension 64 is positioned relative to the flange 71 of the wheelhouse body 65 at a location offset laterally outward from the flange 71, and then brought onto the flange 71.

As shown in FIG. 7, the mating surface 76 of the flange 71 provides a guide surface to guide the top flange 72 when the top flange 72, positioned relative to the flange 71 at the location offset laterally outward from the flange 71, is to be joined to the flange 71. More specifically, the top flange 72 can be set in place relative to the flange 71 by sliding on the mating surface 76 of the flange 71. The mating surface 76 of each of the flanges 71, 72 is slanted with the outer end 73 located higher than the inner end 73, as described above, so as to facilitate attaching the top flange 72 to the flange 71 from the location offset laterally outward from the flange 71.

Finally, the flanges 68 of the outer section 42 are joined to the inner section 41 by welding such as spot-welding, as shown in FIG. 8, while the flanges 71, 72 are joined together by welding such as spot-welding. This completes a process of assembling the side sill 15 and the rear wheelhouse 17 onto the vehicle body 12.

As is clear from the foregoing description, in the first embodiment of the present invention, the right and left side sills 15, 15 have the closed-cross-sectional shapes continuously extending from front ends of the side sills 15 to rear ends of the side sills 15 and, therefore, the side sills 15, 15 have high rigidities. Since the rear end portions 35, 35 of the right and left side sills 15, 15 are joined through the right and left joining members 18, 18 to the right and left wheelhouses 17, 17 with the closed-cross-sectional shapes of the side sills 15, 15 continuously extending longitudinally of the vehicle body, joints between the right and left side sills 15, 15 are joined to the right and left rear wheelhouses 17, 17 have high rigidities. Since the right and left side sills 15, 15 themselves have the high rigidities and the joints have the high rigidities, therefore, the vehicle body 12 entirely has a high rigidity.

An external force applied to the right and left side sills 15, 15 can be substantially evenly dispersed into a rear part of the vehicle body 12 because the external force can be more efficiently transmitted through the rear end portions 35, 35 of a closed-cross-section and the right and left joining members 18, 18 to the right and left rear wheelhouses 17, 17.

The closed-cross-sectional shapes of the right and left side sills 15, 15 extend continuously from the front ends to the rear ends and the rear end portions 35, 35 of the right and left side sills 15, 15 are joined by the right and left joining members 18, 18 to the right and left rear wheelhouses 17, 17. Such a simple structure increases rigidities of lateral sides of the vehicle body 12.

Embodiment 2

A second embodiment of the present invention is described below with reference to FIG. 9 to FIG. 13.

A vehicle body 12A in the second embodiment has substantially the same structure as the vehicle body 12 except that the left joining members 18 shown in FIG. 1 to FIG. 8 are modified into a left joining member 18A shown in FIG. 9 to FIG. 13. Therefore, a description of the vehicle body 12A is omitted. It is noted that a right joining member in the second embodiment is the same structure as the left joining member 18A and therefore a description of the right joining member is omitted.

As shown in FIG. 9 to FIG. 12, the left joining member 18A is a separate member from the left side sill 15. The left joining member 18A lies on and is joined to both the laterally outer panel 62 of the left rear wheelhouse 17 and a rear end portion of the outer section 42, i.e., an outer peripheral surface of the outer section 42.

Figure 11:
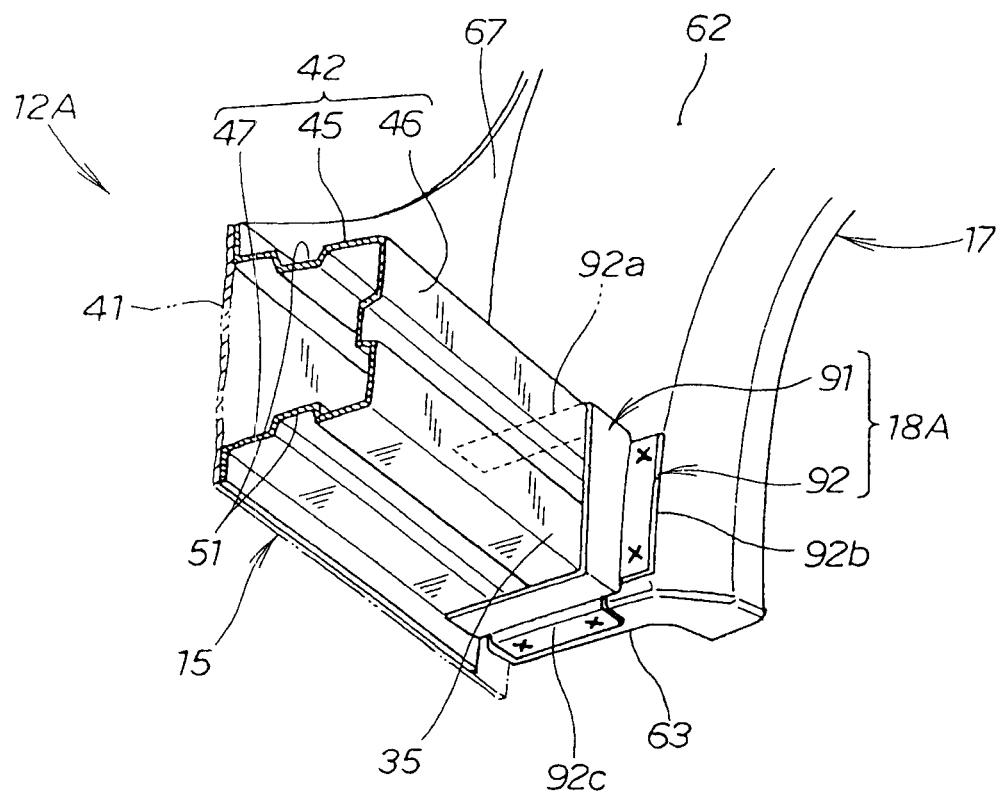
FIG. 11 is a view of the junction of FIG. 10 as viewed in a direction of an arrow 11 of FIG. 10.
Figure 12:
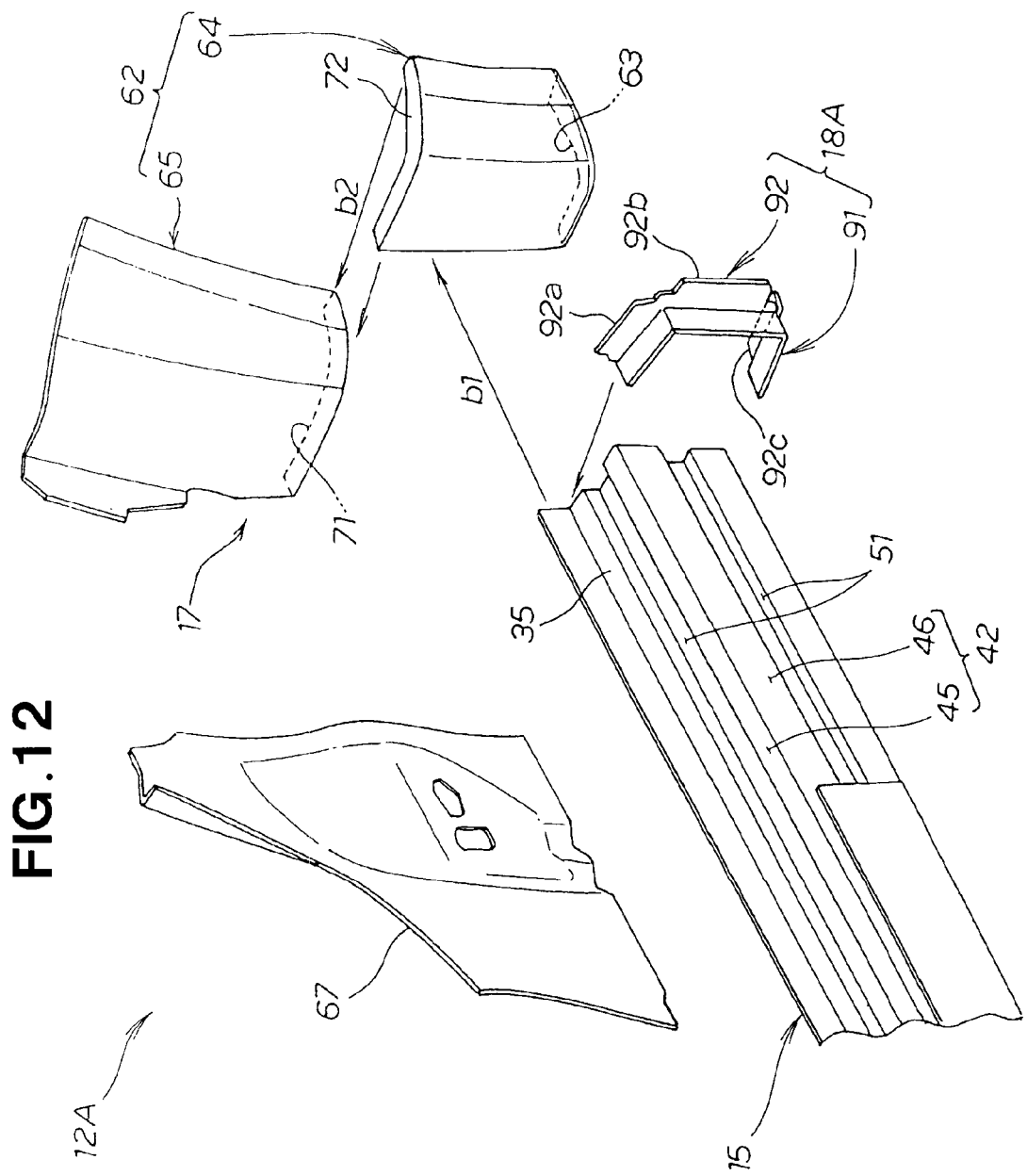
FIG. 12 is an exploded view of the junction where the rear end portion of the left side sill and the left rear wheelhouse shown in FIG. 10 are joined together.

More specifically, the left joining member 18A is provided to the top plate portion 45, the vertical plate portion 46 and the bottom plate portion 47, as shown in FIG. 10 to FIG. 12. The left joining member 18A is joined to the left wheelhouse extension 64. That is to say, the left joining member 18A is joined through the left wheelhouse extension 64 to the left wheelhouse body 65.

More specifically, the left joining member 18A includes a joined portion 91 joined to the rear end portion 35 of the left side sill 15, and a flange portion 92 lying on and joined to a front surface of the left rear wheelhouse 17. The left joining member 18A has a generally U-shaped cross-section conforming to a contour of an outer peripheral surface of the rear end portion of the outer section 42. That is to say, the joined portion 91 lies on and is joined to outer surfaces of the top plate portion 45, the vertical plate portion 47 and the bottom plate portion 47 of the outer section 42. The left joining member 18A may optionally have a shape conforming to a shape of the bead 51.

The flange portion 92 of the left joining member 18A is formed integrally with the joined portion 91. More specifically, the flange portion 92 includes a first flange 92a, a second flange 92b and a third flange 92c. The first flange 92a extends upward from a top surface of the joined portion 91, and lies on and is joined to the front surface of the wheelhouse extension 64. The second flange 92b extends laterally outward from a side surface of the joined portion 91, and lies on and is joined to the front surface of the wheelhouse extension 64. The third flange 92c extends downward from a bottom surface of the joined portion 91, and lies on and is joined to a bottom surface of the bottom flange 63 of the wheelhouse extension 64.

A method for assembling the side sill 15 and the rear wheelhouse 17 onto the vehicle body 12A is as follows.

First, the vehicle body 12A with the inner section 41 and the wheelhouse body 65 assembled thereonto is provided as shown in FIG. 9.

Second, the joining member 18A is fitted to the rear end portion of the outer section 42, as shown in FIG. 12. The joining member 18A is then joined to the outer section 42 by welding such as spot-welding.

Figure 13:
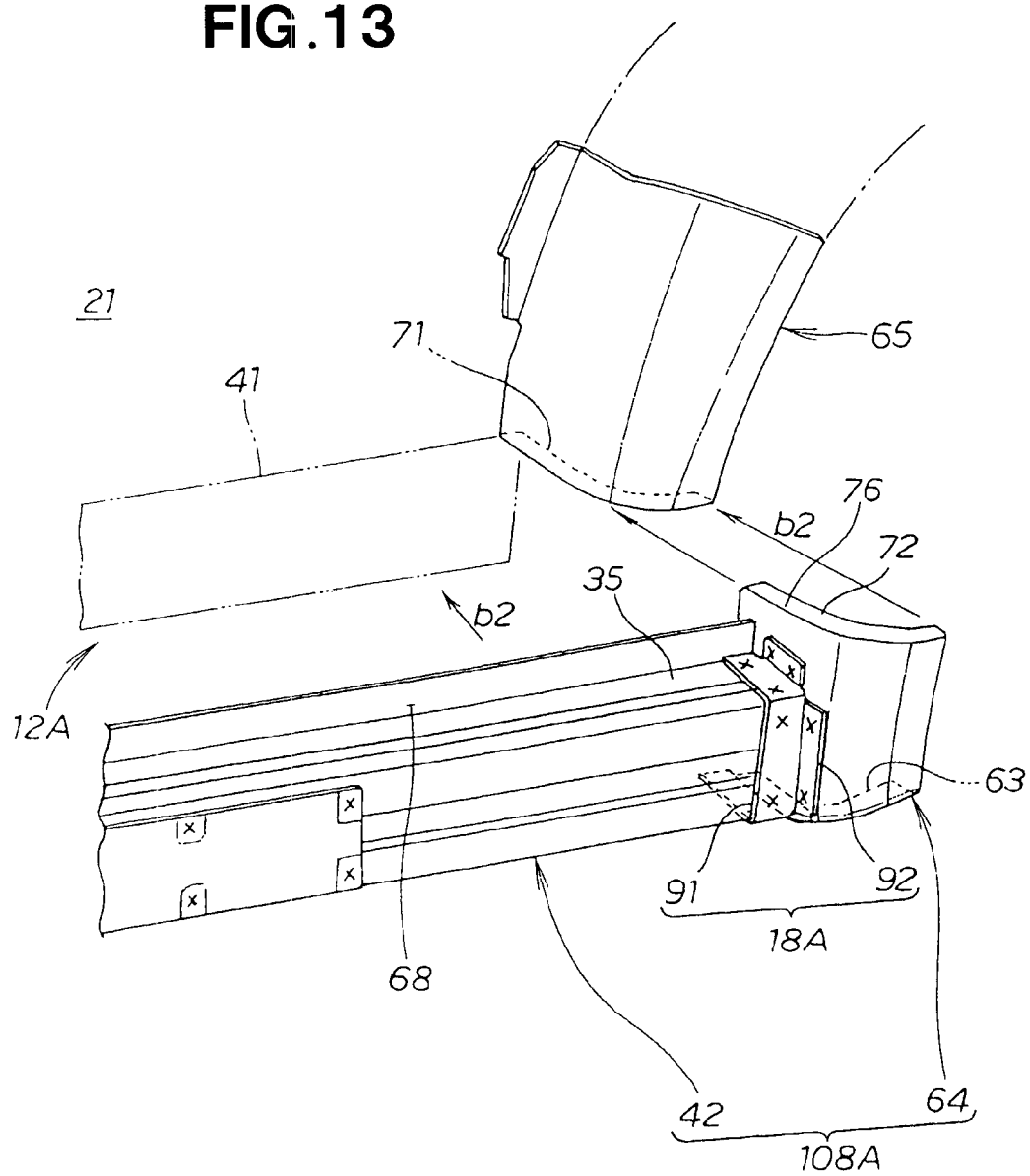
FIG. 13 is a view showing a method for assembling the left side sill and the left rear wheelhouse shown in FIG. 12 onto a vehicle body.

Next, the outer section 42 is brought toward the wheelhouse extension 64, as indicated by an arrow b1 of FIG. 12, in such a manner that the flanges 92a, 92b, 92c of the joining member 18A lie on the front surface and the bottom flange 63 of the wheelhouse extension 64. The flanges 92a, 92b, 92c are then joined to the front surface and the bottom flange 63 of the wheelhouse extension 64 by welding such as spot-welding. As a result, the outer section 42 is joined to the wheelhouse extension 64, as shown in FIG. 13. An assembly 108A of the outer section 42 and the wheelhouse extension 64 joined to the outer section 42 is hereinafter referred to as "a side sill outer assembly 108A".

Next, the side sill outer assembly 108A is positioned relative to the vehicle body 12A at a location offset laterally outward from the vehicle body 12A, and is assembled onto the vehicle body 12A. More specifically, the outer section 42 is positioned relative to the inner section 41 at the location offset laterally outward from the inner section 41, and then brought onto the inner section 41. At the same time, the top flange 72 of the wheelhouse extension 64 is positioned relative to the flange 71 of the wheelhouse body 65 at a location offset laterally outward from the flange 71, and then brought onto the flange 71.

Finally, the flanges 68 of the outer section 42 are joined to the inner section 41 by welding such as spot-welding, as shown in FIG. 13, while the flanges 71, 72 are joined together by welding such as spot-welding. This completes a process of assembling the side sill 15 and the rear wheelhouse 17 onto the vehicle body 12A.

As is clear from the foregoing description, the second embodiment of the present invention provides the same advantage as the first embodiment of the present invention. That is to say, the second embodiment of the present invention can increase a strength of the vehicle body 12A. Since the joining member 18A is the separate member from the side sill 15, the side sill 15 has a simple configuration free from the joining member 18A.

Embodiment 3

A third embodiment of the present invention is described below with reference to FIG. 14 and FIG. 15.

Figure 14:
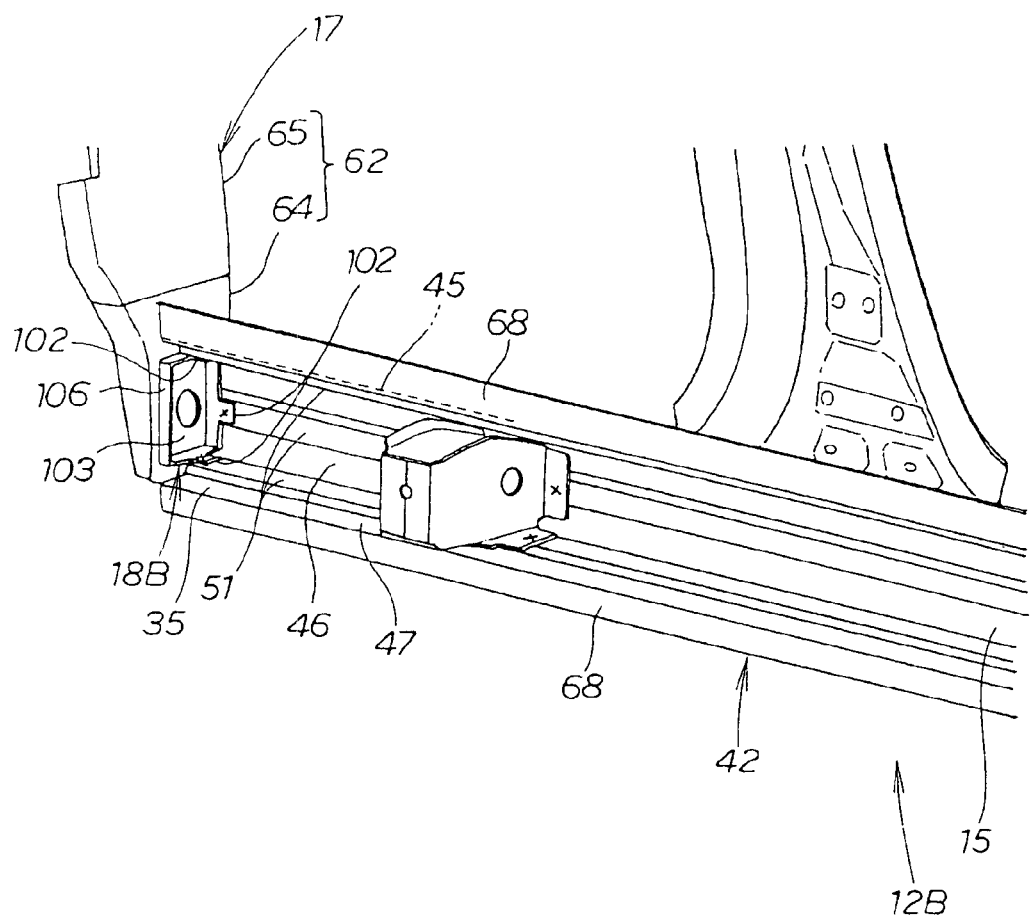
FIG. 14 is a vehicle body side structure in a third embodiment of the present invention with a left side sill joined to a left rear wheelhouse when the structure is viewed from a passenger compartment.

A vehicle body 12B in the third embodiment has substantially the same structure as the vehicle body 12A except that the left joining member 18A shown in FIG. 9 to FIG. 13 is modified into a left joining member 18B shown in FIG. 14 and FIG. 15. Therefore, a description of the vehicle body 12B is omitted. It is noted that a right joining member in the third embodiment is the same structure as the left joining member 18B and therefore a description of the right joining member is omitted.

As shown in FIG. 14 and FIG. 15, the left joining member 18B in the third embodiment is a separate member from the left side sill 15. The left joining member 18B lies on and is joined to both the laterally outer panel 62 of the left rear wheelhouse 17 and the rear end portion of the outer section 42, i.e., to an inner surface of the rear end portion of the outer section 42.

More specifically, the left joining member 18B includes a plurality of joined portions 102, 102, 102 lying on and joined to an inner surface of the rear end portion 35 of the left side sill 15, and a plate portion 103 lying on and joined to the front surface of the left rear wheelhouse 17. The joined portions 102, 102, 102 lie on and are joined to respective inner surfaces of the top plate portion 45, the bottom plate portion 47 and the vertical plate portion 46. In particular, the joined portions 102, 102, 102 lie on and are joined to respective beads 51, 51, 51 of the top plate portion 45, the bottom plate portion 47 and the vertical plate portion 46. The joined portions 102, 102, 102 are substantially the same in width as the respective beads 51, 51, 51 of the top plate portion 45, the bottom plate portion 47 and the vertical plate portion 46.

It is noted that the joined portions 102, 102, 102 are not necessarily be required to have configurations conforming to contours of the beads 51, 51, 51. For example, the joined portions 102, 102, 102 may have configurations conforming to a contour of an entire inner surface of the left side sill 15 rather than to the contours of the beads 51, 51, 51.

The plate portion 103 is generally flat so that the plate portion 103 can lie on the front surface of the left wheelhouse extension 64. The plate portion 103 is joined to the front surface of the left wheelhouse extension 64. As a result, the plate portion 103 is joined through the wheelhouse extension 64 to the wheelhouse body 65.

The plate portion 103 has a rib 106 formed integrally with an entire outer edge thereof. The rib 106 reinforces the joined portions 102 and has a frame-shape protruding from the outer edge of the plate portion 103 into the outer section 42.

The plurality of the joined portions 102, 102, 102 have flat plate shapes projecting from a distal end of the frame-shaped rib 106 into the rear end portion of the outer section 42. The joined portions 102, 102, 102 are formed integrally with the plate portion 103.

A method for assembling the side sill 15 and the rear wheelhouse 17 onto the vehicle body 12B is as follows.

First, the vehicle body 12B with the inner section 41 and the wheelhouse body 65 assembled thereonto is provided as shown in FIG. 15.

Second, the joining member 18B is fitted to and joined to the rear end portion of the outer section 42 by welding such as spot-welding. More specifically, the plurality of the joined portions 102, 102, 102 are fitted into the rear end portion of the outer section 42 so that the joined portions 102, 102, 102 lie on the respective beads 51, 51, 51. The joined portions 102, 102, 102 are then welded to the beads 51, 51, 51 by welding such as spot-welding.

Next, the plate portion 103 of the joining member 18B is brought onto the front surface of the left wheelhouse extension 64, as indicated by an arrow c1 of FIG. 15. The plate portion 103 is then joined to the front surface of the left wheelhouse extension 64 by welding such as spot-welding. As a result, the outer section 42 is joined to the wheelhouse extension 64. An assembly 108B of the outer section 42 and the wheelhouse extension 64 joined to the outer section 42 is hereinafter referred to as "a side sill outer assembly 108B".

Next, the side sill outer assembly 108B is positioned relative to the vehicle body 12B at a location offset laterally outward from the vehicle body 12B, and then is assembled onto the vehicle body 12B. More specifically, the outer section 42 is positioned relative to the inner section 41 at a location laterally outward from the inner section 41, and then is brought onto the inner section 41. At the same time, the top flange 72 of the wheelhouse extension 64 is positioned relative to the flange 71 of the wheelhouse body 65, and then is brought onto the flange 71.

Finally, the flange 68 of the outer section 42 is joined to the inner section 41 by welding such as spot-welding and the flanges 71, 72 are joined together by welding such as spot-welding. This completes a process of assembling the side sill 15 and the rear wheelhouse 17 onto the vehicle body 12B.

As is clear from the foregoing description, the third embodiment provides the same advantage as the first and second embodiments. That is to say, the third embodiment of the present invention can increase a strength of the vehicle body 12B. Since the joining member 18B is the separate member from the side sill 15, the side sill 15 has a simple configuration free from the joining member 18B. In addition, the rear end portion 35 of the side sill 15 has its end on a side of the wheelhouse 17 and this end is closed by the plate portion 103 of the joining member 18B. As a result, the rear end portion 35 has a high strength, whereby the side sill 15 has a high strength.

INDUSTRIAL APPLICABILITY

A vehicle body side structure of the present invention is preferably used in a body of a vehicle such as a car.

REFERENCE SIGNS LIST

11 . . . a vehicle, 12, 12A, 12B . . . vehicle bodies, 15 . . . a side sill, 16 . . . a rear wheel, 17 . . . a rear wheelhouse, 18, 18A, 18B . . . joining members, 35 . . . a rear end portion, 41 . . . an inner section, 42 . . . an outer section, 45 . . . a top plate portion, 46 . . . a vertical plate portion, 47 . . . a bottom plate portion, 51 . . . a bead, 64 . . . a wheelhouse body, 65 . . . a wheelhouse extension, 71 . . . a flange, 72 . . . a flange, 73 . . . a laterally inner end, 74 . . . a laterally outer end, 76 . . . a mating surface, 91 . . . a joined portion, 92 . . . flange portion, 102 . . . a joined portion, 103 . . . a plate portion

The invention claimed is:

1. A vehicle body side structure comprising:
   right and left side sills disposed on left and right sides of a vehicle body and extending longitudinally of the vehicle body;
   right and left rear wheelhouses disposed rearward of the right and left side sills and covering upper halves of right and left rear wheels,
   wherein the right and left side sills have closed-cross-sectional shapes continuously extending from front ends of the right and left side sills to rear ends of the right and left side sills, and the right and left side sills have right and left joining members joining rear end portions of the right and left side sills to the right and left rear wheelhouses with the closed-cross-sectional shapes maintained,
   wherein the right and left rear wheelhouses comprise right and left wheelhouse bodies assembled onto the vehicle body, and right and left wheelhouse extensions extending downward from and joined to front lower ends of the right and left wheelhouse bodies,
   wherein the right and left wheelhouse bodies have right and left flanges at the front lower ends,
   wherein the right and left wheelhouse extensions have right and left flanges joined to the right and left flanges of the right and left wheelhouse bodies assembled onto the vehicle body,
   wherein the right and left joining members are joined to the right and left wheelhouse extensions joined to the right and left wheelhouse bodies,
   wherein the right and left flanges of the right and left wheelhouse bodies have mating surfaces and the right and left flanges of the right and left wheelhouse extensions have mating surfaces underlying and joined to the mating surfaces of the right and left flanges of the right and left wheelhouse bodies, and
   wherein the mating surfaces of the right and left flanges of the right and left wheelhouse bodies have laterally inner ends and laterally outer ends, and are slanted with the laterally outer ends located higher than the laterally inner ends, and the mating surfaces of the right and left flanges of the right and left wheelhouse extensions have laterally inner ends and laterally outer ends, and are slanted with the laterally outer ends located higher than the laterally inner ends.

2. The structure of claim 1, wherein the right and left side sills comprise right and left inner sections disposed laterally inward of the vehicle body and right and left outer sections disposed laterally outward of the vehicle body, and
   wherein the right and left outer sections are provided with the right and left joining members.

3. The structure of claim 2, wherein the right and left outer sections are generally U-shaped cross-sectional members opened in a laterally inward direction of the vehicle body,
   wherein the generally U-shaped cross-sectional members each include a vertical plate portion disposed laterally outward of the vehicle body in generally perpendicular orientation, a top plate portion extending from a top end of the vertical plate portion in the laterally inward direction of the vehicle body, and a bottom plate portion extending from a bottom end of the vertical plate portion in the laterally inward direction of the vehicle body, and
   wherein each of the right and left joining members is provided to at least one of the vertical plate portion and the top plate portion.

4. The structure of claim 3, wherein at least one of the vertical plate portion, the top plate portion and the bottom plate portion has a bead extending longitudinally of the right and left outer sections.

5. The structure of claim 1, wherein the right and left joining members are formed integrally with the rear end portions of the right and left side sills, and lie on and are joined to the right and left rear wheelhouses.

6. The structure of claim 1, wherein the right and left joining members are separate members from the right and left side sills,
   wherein the separate members comprise right and left joined portions joined to the rear end portions of the right and left side sills, and right and left flange portions lying on and joined to the right and left rear wheelhouses, and
   wherein the right and left flange portions are formed integrally with the right and left joined portions.

7. The structure of claim 1, wherein the right and left joining members are separate members from the right and left side sills,
   wherein the separate members comprise right and left joined portions joined to inner surfaces of the rear end portions of the right and left side sills, and right and left plate portions lying on and joined to the right and left rear wheelhouses, and
   wherein the right and left plate portions are formed integrally with the right and left joined portions.

8. The structure of claim 2, wherein the right and left joining members are formed integrally with the rear end portions of the right and left side sills, and lie on and are joined to the right and left rear wheelhouses.

9. The structure of claim 2, wherein the right and left joining members are separate members from the right and left side sills,
wherein the separate members comprise right and left joined portions joined to the rear end portions of the right and left side sills, and right and left flange portions lying on and joined to the right and left rear wheelhouses, and
wherein the right and left flange portions are formed integrally with the right and left joined portions.

10. The structure of claim 2, wherein the right and left joining members are separate members from the right and left side sills,
wherein the separate members comprise right and left joined portions joined to inner surfaces of the rear end portions of the right and left side sills, and right and left plate portions lying on and joined to the right and left rear wheelhouses, and
wherein the right and left plate portions are formed integrally with the right and left joined portions.

11. The structure of claim 3, wherein the right and left joining members are formed integrally with the rear end portions of the right and left side sills, and lie on and are joined to the right and left rear wheelhouses.

12. The structure of claim 3, wherein the right and left joining members are separate members from the right and left side sills,
wherein the separate members comprise right and left joined portions joined to the rear end portions of the right and left side sills, and right and left flange portions lying on and joined to the right and left rear wheelhouses, and
wherein the right and left flange portions are formed integrally with the right and left joined portions.

13. The structure of claim 3, wherein the right and left joining members are separate members from the right and left side sills,
wherein the separate members comprise right and left joined portions joined to inner surfaces of the rear end portions of the right and left side sills, and right and left plate portions lying on and joined to the right and left rear wheelhouses, and
wherein the right and left plate portions are formed integrally with the right and left joined portions.

14. The structure of claim 4, wherein the right and left joining members are formed integrally with the rear end portions of the right and left side sills, and lie on and are joined to the right and left rear wheelhouses.

15. The structure of claim 4, wherein the right and left joining members are separate members from the right and left side sills,
wherein the separate members comprise right and left joined portions joined to the rear end portions of the right and left side sills, and right and left flange portions lying on and joined to the right and left rear wheelhouses, and
wherein the right and left flange portions are formed integrally with the right and left joined portions.

16. The structure of claim 4, wherein the right and left joining members are separate members from the right and left side sills,
wherein the separate members comprise right and left joined portions joined to inner surfaces of the rear end portions of the right and left side sills, and right and left plate portions lying on and joined to the right and left rear wheelhouses, and
wherein the right and left plate portions are formed integrally with the right and left joined portions.

* * * * *